(12) United States Patent
Zhang

(10) Patent No.: US 12,196,909 B2
(45) Date of Patent: Jan. 14, 2025

(54) FLOOR-MOUNTED SECURITY DEVICE ACTIVATED BY WEIGHT FOR TESTING METAL OBJECTS

(71) Applicant: TRIPLE WIN TECHNOLOGY(SHENZHEN) CO.LTD., Shenzhen (CN)

(72) Inventor: Fei Zhang, Nanning (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 446 days.

(21) Appl. No.: 17/718,303

(22) Filed: Apr. 11, 2022

(65) Prior Publication Data

US 2023/0009621 A1 Jan. 12, 2023

(30) Foreign Application Priority Data

Jul. 8, 2021 (CN) .......................... 202121549209.5

(51) Int. Cl.
  *G01V 3/10* (2006.01)
  *G01V 3/36* (2006.01)
  *G08B 21/18* (2006.01)
(52) U.S. Cl.
  CPC .................. *G01V 3/10* (2013.01); *G01V 3/36* (2013.01); *G08B 21/18* (2013.01)

(58) Field of Classification Search
  CPC ..... G01R 27/00; G01R 27/26; G01R 33/1223
  See application file for complete search history.

(56) References Cited

U.S. PATENT DOCUMENTS

| 7,327,137 | B1 * | 2/2008 | Crowley ................ | G01R 33/44 |
| | | | | 324/307 |
| 2011/0267235 | A1 * | 11/2011 | Brommer ................ | H01Q 7/00 |
| | | | | 342/457 |
| 2012/0086450 | A1 * | 4/2012 | Crowley .............. | G01N 24/084 |
| | | | | 324/322 |
| 2014/0201126 | A1 * | 7/2014 | Zadeh .................... | A61B 5/165 |
| | | | | 706/52 |
| 2020/0103546 | A1 * | 4/2020 | Monnier .................. | G01V 3/10 |
| 2020/0135004 | A1 * | 4/2020 | Ellenbogen .............. | G07C 9/38 |

* cited by examiner

*Primary Examiner* — Jermele M Hollington
*Assistant Examiner* — Temilade S Rhodes-Vivour
(74) *Attorney, Agent, or Firm* — ScienBiziP, P.C.

(57) ABSTRACT

A floor-mounted security device able to test personnel for metal material carried in or at the bottom of their footwear includes an induction module, a pressure sensing module, and an automatic alarm module. The pressure sensing module senses weight and pressure of a person standing, and outputs a trigger signal to the induction module to trigger operation of the induction module. The induction module can detect the presence of a metal mass by the change in a magnetic field, and output a control signal accordingly. The automatic alarm module outputs an alarm when prompted by the control signal.

18 Claims, 3 Drawing Sheets

FLOOR-MOUNTED SECURITY DEVICE ACTIVATED BY WEIGHT FOR TESTING METAL OBJECTS

FIELD

The subject matter herein generally relates to security devices.

BACKGROUND

Personnel in a factory must undergo scanning, including their feet and soles of their footwear, when entering and leaving the factory to check for items carried without permission. In the prior art, the hand-held scanner is usually used to scan the whole body, feet, and soles of shoes. However, the inspection of sole of a shoe needs the employee to stand on tiptoe, which will be unstable for the person being tested, and there may be unscanned areas. Such manual detection becomes very inefficient when the number of personnel entering/exiting the factory is large, and the scanner operators may be prone to errors due to fatigue.

Therefore, improvement is desired.

BRIEF DESCRIPTION OF THE DRAWINGS

Implementations of the present disclosure will now be described, by way of embodiments, with reference to the attached figures.

DETAILED DESCRIPTION

Figure 1:
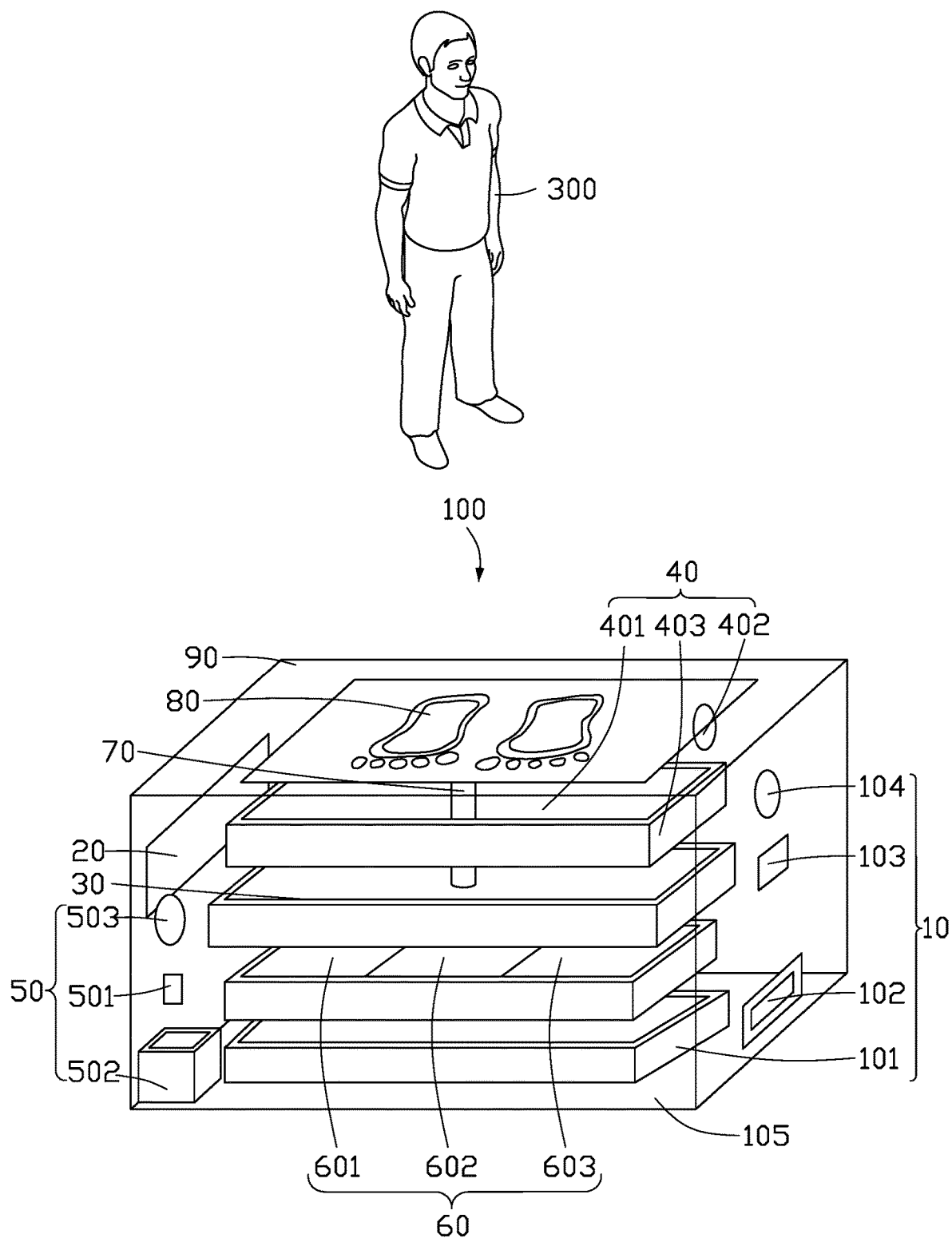
FIG. 1 is a schematic diagram of an embodiment of a security device of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a security device 100 in accordance with an embodiment of the present disclosure. The security device 100 includes a power supply module 10, a card reading module 20, a pressure sensing module 30, an induction module 40, an automatic alarm module 50, a data transmission module 60, an elastic member 70, a detection area 80, a floor-mounted housing 90, and a transparent panel 105. The pressure sensing module 30, the induction module 40, and the automatic alarm module 50 can be received in the housing 90. The top of the housing 90 defines the detection area 80. The pressure sensing module 30 is connected to the detection area 80 through the elastic member 70, and the transparent panel 105 is disposed in front of the housing 90.

In one embodiment, an anti-skid pad can be disposed on the detection area 80, the anti-skid pad can prevent the person being tested from slipping. Further, a left foot shape and a right foot shape can be disposed on the anti-skid pad to indicate the standing position of the person.

In the embodiment, the power supply module 10 includes a battery 101, a charging port 102, a power switch 103, and a power indicator 104. The battery 101 is disposed in the bottom, the charging port 102, the power switch 103 and the power indicator 104 are located on the right side of the housing 90. The battery 101 is electrically connected to other components for supplying power. The power switch 103 is electrically connected to the battery 101, and the power switch 103 is used to control whether the battery 101 supplies power. The power indicator 104 is electrically connected to the power switch 103. When the power switch 103 is turned on, the power indicator 104 is activated, indicating that the security device 100 is working and ready to receive and test persons who are to undergo testing (person 300). When the power switch 103 is turned off, the power indicator 104 is off, indicating that the security device 100 is not working.

Figure 2:
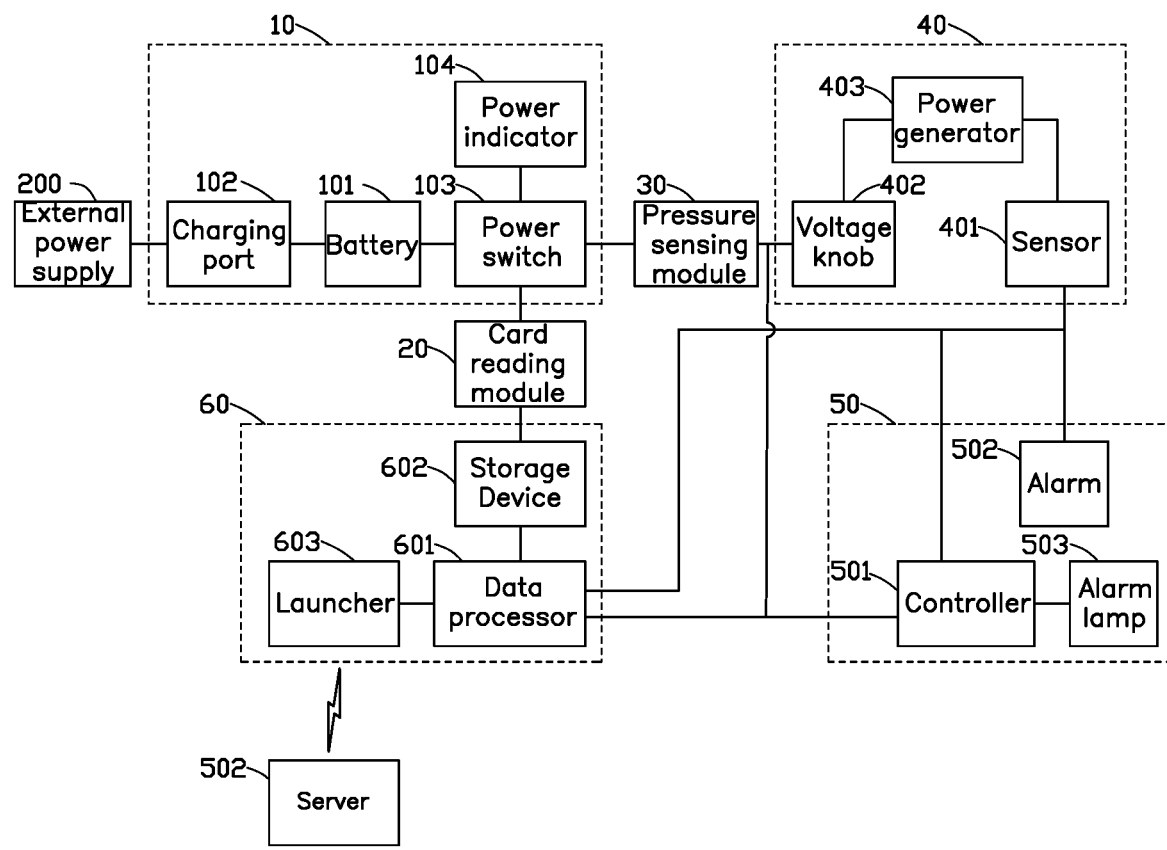
FIG. 2 is a block diagram of an embodiment of the security device shown in FIG. 1.

In some embodiment, the battery 101 is electrically connected to an external power supply 200 (shown in FIG. 2) through the charging port 102. When the external power supply 200 is turned on, the external power supply 200 charges the battery 101 through the charging port 102. When the external power supply 200 is turned off, the battery 101 supplies power to other components.

In the embodiment, the card reading module 20 is disposed on the left side of the housing 90, and the 20 is electrically connected to the data transmission module 60. The card reading module 20 is used to detect information of the card of the person 300. When the work card of the person 300 approaches the card reading module 20, the card reading module 20 reads the information of the work card, generates signals as to information of the work card, and outputs the signals to the data transmission module 60.

The pressure sensing module 30 is connected to the detection area 80 through the elastic member 70, and the elastic member 70 can pass through the induction module 40. The pressure sensing module 30 is also electrically connected to the induction module 40, the automatic alarm module 50, and the data transmission module 60. The pressure sensing module 30 senses the weight and pressure of the person 300. When the pressure sensing module 30 senses the pressure of a person 300, the pressure sensing module 30 outputs a trigger signal to the induction module 40, so as to trigger the operation of the induction module 40.

When the person 300 stands on the detection area 80, the detection area 80 is pressed down, and the downward pressure is transmitted to the pressure sensing module 30 through the elastic member 70. Thus, the pressure sensing module 30 detects the person 300 and outputs a trigger signal to the induction module 40, the automatic alarm module 50, and the data transmission module 60 to trigger the operation of the induction module 40, the automatic alarm module 50, and the data transmission module 60. The induction module 40 is disposed on the top of the housing 90 and close to the detection area 80.

The induction module 40 includes a sensor 401, a voltage knob 402 and a power generator 403. The induction module 40 can detect metal material on or below the feet of the person 300, and to output a control signal to the automatic alarm module 50 when metal material is found. The voltage knob 402 is electrically connected to the power generator 403, to adjust the input voltage of the power generator 403. The power generator 403 is electrically connected to the sensor 401. When the power generator 403 receives the trigger signal output by the pressure sensing module 30 through the voltage knob 402, the power generator 403 generates an alternating current according to the input voltage and outputs the alternating current to the sensor 401. When the input voltage is large, the power generator 403 can generate a large alternating current. When the input voltage is small, the power generator 403 can generate a small alternating current.

The sensor 401 includes a plurality of coils. When the sensor 401 receives the alternating current generated by the power generator 403, the alternating current flows through the plurality of coils, and a changing first magnetic field will be generated around the plurality of coils. When the input voltage of the power generator 403 is large, the first magnetic field range is large, when the input voltage of the power generator 403 is small, the first magnetic field range is small. Therefore, the size of the detection range can be changed by adjusting the voltage knob 402.

When metal material is found on or below the feet of the person 300, due to the electromagnetic induction phenomenon, the metal material cuts the magnetic induction line of the magnetic field, so the induced current will be generated in the metal material, the induced current will generate a second magnetic field, and the second magnetic field will affect the first magnetic field. When the first magnetic field changes, the alternating current will also change. When the alternating current changes, the sensor 401 can detect the change and output a control signal to the automatic alarm module 50 and the data transmission module 60. The control signal indicates that a metal substance is found on the person 300.

The automatic alarm module 50 includes a controller 501, an alarm 502, and an alarm lamp 503. The controller 501 is electrically connected to the sensor 401, the 302, and the alarm lamp 503. The automatic alarm module 50 is used to output warning information according to the control signal. The controller 501 is used to control the lighting of the controller 501 according to the trigger signal and the control signal. When the controller 501 only receives the trigger signal, the controller 501 can control the green light of the alarm lamp 503 to turn on. The green light of the alarm lamp 503 indicates that no metal material is found on the person 300. When the controller 501 receives the trigger signal and the control signal, the controller 501 can control the red light of the alarm lamp 503 to turn on. The red light of the alarm lamp 503 indicates that metal material is found on the person 300. The alarm 502 is used to give an alarm according to the trigger signal and the control signal. When the alarm 502 receives the control signal, the control signal can make the alarm 502 give an alarm and show that metal material is found on the person 300.

The data transmission module 60 includes a data processor 601, a storage device 602, and a launcher 603.

The storage device 602 is electrically connected to the card reading module 20 and the data processor 601. The storage device 602 is used to store the identity signal output by the card reading module 20 and to transmit the identity signal to the data processor 601. In some embodiment, when the identity signal has been stored in the storage device 602, if the storage device 602 receives the new identity signal output by the card reading module 20, the storage device 602 can overwrite the stored identity signal with the new identity signal to ensure that the data collected matches the latest person 300. For example, when a first identification signal of a first employee has been stored in the storage device 602, a second employee uses his own work card to read the card, at this time, the card reading module 20 reads the work card information of the second employee and generates a second identity signal associated with the work card information of the second employee. The storage device 602 can cover the first identity signal with the second identity signal and output the second identity signal to the data processor 601.

The data processor 601 is electrically connected to the pressure sensing module 30, the sensor 401, and the launcher 603. The data processor 601 is used to determine whether to continue to receive the identity signal output by the storage device 602 according to the trigger signal. When the data processor 601 receives the trigger signal, the data processor 601 can receive the identity signal output by the storage device 602. It can be understood that there is a person 300 at this time.

The data processor 601 also multiplexes the trigger signal and the identity signal and generates a first data signal or a second data signal. When the data processor 601 only receives the trigger signal, the data processor 601 can receive the identity signal output by the storage device 602, multiplex the trigger signal and the identity signal, generate a first data signal, and output it to the launcher 603. It can be understood that the first data signal indicates the presence of the person 300 and that no metal substance is found.

When the data processor 601 receives the trigger signal and the control signal, the data processor 601 can receive the identity signal of the storage device 602. The data processor 601 multiplexes the control signal and the identity signal, generates a second data signal, and outputs the second data signal to the launcher 603. The second data signal indicates that metal substance is found on the person 300.

The launcher 603 is electrically connected to data processor 601, the launcher 603 is used to transmit the first data information or the second data information to a server 400 through radio transmission technology. For example, the launcher 603 can send data to the server 400 through a wireless local area network (WLAN). When the launcher 603 receives the first data information or the second data information of the data processor 601, the launcher 603 transmit the first data information or the second data information to the server 400.

When the power switch 103 is turned on, and there is no person 300 on the detection area 80, the pressure sensing module 30 does not detect any pressure of the person 300, the pressure sensing module 30 outputs no trigger signal to other components. At this time, the induction module 40, the automatic alarm module 50 and the data transmission module 60 do not work. Thus, the security device 100 provided by the present disclosure can save power consumption until there are persons to be tested.

When the power switch 103 is turned on and there is a person 300 on the detection area 80, the person 300 needs to put his work card close to the card reading module 20. The card reading module 20 can read the information of the work card and output the identity signal associated with the information of the work card of the person 300 to the storage device 602.

The person 300 needs to stand on the detection area 80, the pressure sensing module 30 can detect the weight and pressure of the person 300, output the trigger signal to the power generator 403 in the induction module 40 through the voltage knob 402, and output the trigger signal to the data processor 601 of the data transmission module 60 and the controller 501 of the automatic alarm module 50. When the power generator 403 receives the trigger signal, the power generator 403 can generate the alternating current according to the voltage adjusted by the voltage knob 402, and the alternating current is input to the sensor 401 for generating a changed magnetic field.

If no metal substance is found, the magnetic field generated by the sensor 401 will not change. It can be understood that the sensor 401 does not output the control signal, the alarm 502 in the automatic alarm module 50 does not send an alarm, and the controller 501 in the automatic alarm module 50 only receives the trigger signal. The controller 501 turns on the green light of the alarm lamp 503. The data processor 601 in the data transmission module 60 only receives the trigger signal, the data processor 601 receives the identity signal generated by the storage device 602, multiplexes the trigger signal and the identity signal, generates a first data signal, and outputs the first data signal to the launcher 603. The launcher 603 transmits the first data signal to the server by radio. The first data signal indicates that no metal substance is found on the person 300 associated with the identity signal.

When metal substance is found on the person 300, the magnetic field generated by the sensor 401 will change. The sensor 401 outputs the control signal so that the alarm 502 in the automatic alarm module 50 sends an alarm. The controller 501 of the automatic alarm module 50 receives the trigger signal and the control signal, and the controller 501 lights the red light of the alarm lamp 503. The data processor 601 of the data transmission module 60 receives the trigger signal and the control signal. Therefore, the data processor 601 receives the identity signal generated by the storage device 602, multiplexes the control signal and the identity signal, generates a second data signal, and outputs the second data signal to the launcher 603. The launcher 603 transmits the second data signal to the server by radio. The second data signal indicates that metal substance is found on the person 300 associated with the identity signal.

Figure 3:
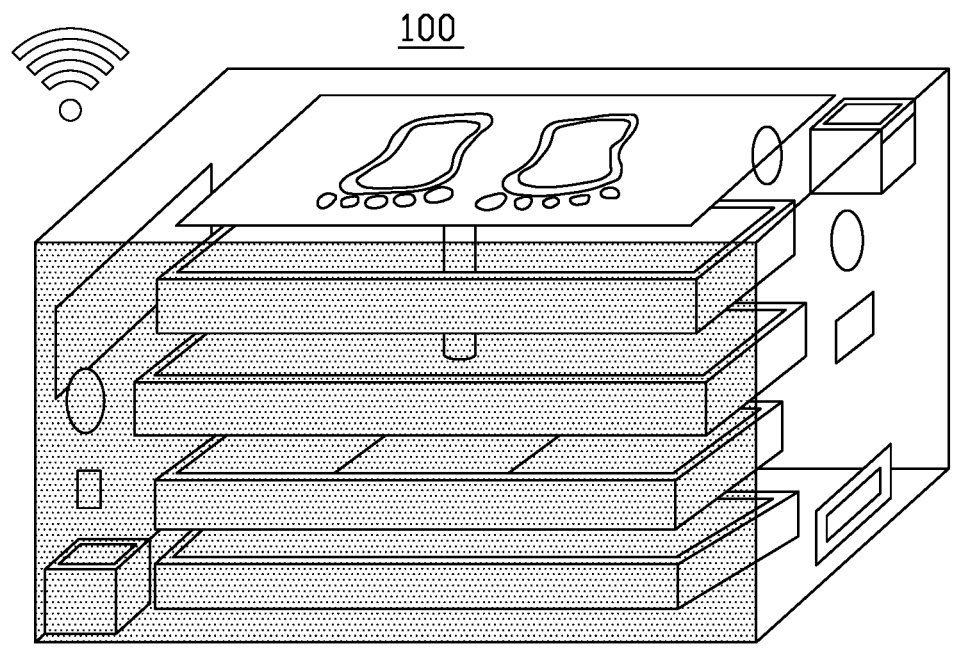
FIG. 3 is a schematic diagram of another embodiment of a security device of the present disclosure.

Referring to FIG. 3, when no metal substance is found, the green light of the alarm lamp 503 lights up and appears in front of the user through the transparent panel 105, and the launcher 603 sends the first data information to the server.

Figure 4:
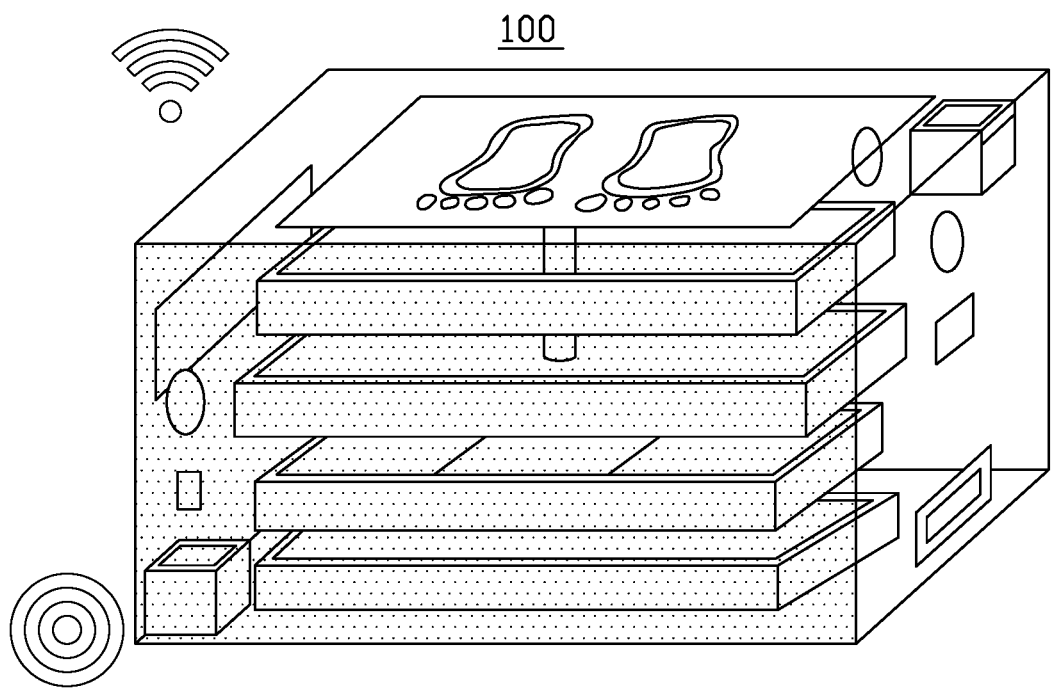
FIG. 4 is a schematic diagram of another embodiment of a security device of the present disclosure.

Referring to FIG. 4, when metal substance is found, the red light of the alarm lamp 503 lights up and appears in front of the user through the transparent panel 105, the alarm 502 gives an alarm, and the launcher 603 sends the second data information to the server 400.

The security device provided by the embodiment of the present disclosure has the advantages of saving power consumption, clear results of detection, and real-time transmission of detection data. The present disclosure can be used to detect and record the metal mass carried by the person 300 efficiently.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the exemplary embodiments described above may be modified within the scope of the claims.

What is claimed is:

1. A security device comprising:
an induction module;
a pressure sensing module configured to sense pressure of a person, output a trigger signal to the induction module to trigger operation of the induction module; wherein the induction module is configured to detect whether there is metal substance on sole of the person, and output a control signal when there is metal substance on the sole of the person; and
an automatic alarm module configured to output alarm according to the control signal;
wherein the security device further comprises an housing, the induction module is disposed on the housing and near the detection area, the induction module comprises a sensor, a voltage knob, and a power generator; the voltage knob is electrically connected to the power generator, the voltage knob adjusts input voltage of the power generator; the power generator is electrically connected to the sensor, the power generator generates alternating current according to the input voltage, and outputs the alternating current to the sensor.

2. The security device according to claim 1, wherein the security device further comprises a power supply module, the power supply module comprises a battery and a power switch, the battery supplies electric power to the security device, and the power switch controls whether the battery supplies electric power to the security device.

3. The security device according to claim 2, wherein the security device further comprises a card reading module and a data transmission module, the card reading module is electrically connected to the data transmission module, the card reading module is configured to read information of a work card; when the work card is near the card reading module, the card reading module reads the information of the work card, generates an identity signal associated with the information of the work card, and outputs the identity signal to the data transmission module.

4. The security device according to claim 3, wherein the security device further comprises an elastic member; a top of the housing comprises a detection area, and the pressure sensing module is connected to the detection area through the elastic member; when the person is positioned on the detection area, the detection area is recessed downward, and a downward recessed pressure is transmitted to the pressure sensing module through the elastic member.

5. The security device according to claim 4, wherein the automatic alarm module comprises a controller, an alarm and an alarm lamp, and the controller is electrically connected to the sensor, the sensor and the alarm lamp; the controller is configured to control light of the alarm lamp according to the trigger signal and the control signal, the alarm is configured to give an alarm according to the trigger signal and the control signal.

6. The security device according to claim 5, wherein the data transmission module comprises a data processor, a storage device and a launcher, the data processor is electrically connected to the pressure sensing module, the sensor and the launcher, and the data processor is configured to determine whether to continue to receive the identity signal according to the trigger signal; the data processor multiplexes the identity signal, the control signal, and the trigger signal, and generates a first data signal or a second data signal; the first data signal indicates the sole of the person does not comprises metal substance, and the second data signal indicates the sole of the person comprises metal substance.

7. The security device according to claim 6, wherein the storage device is electrically connected to the card reading module and the data processor, the storage device is configured to store the identity signal output by the card reading module and transmit the identity signal to the data processor; the transmitter is electrically connected to the data processor, and the launcher is configured to transmit the first data signal or the second data signal to a server by radio.

8. The security device according to claim 4, wherein a first end of the elastic member is held against the detection area, and a second end of the elastic member is connected to the pressure sensing module through the induction module.

9. The security device according to claim 4, wherein the security device further comprises a transparent panel, the detection area is disposed on an upper surface of the housing, and the transparent panel is disposed in front of the housing.

10. A security device comprising:
an induction module;
a pressure sensing module configured to sense pressure of a person, output a trigger signal to the induction module to trigger operation of the induction module; wherein the induction module is configured to detect whether there is metal substance on sole of the person, and output a control signal when there is metal substance on the sole of the person;
an automatic alarm module configured to output alarm according to the control signal; and
an housing receiving the induction module, the pressure sensing module, and the automatic alarm module;
wherein the induction module is disposed on the housing and near to the detection area, the induction module comprises a sensor, a voltage knob, and a power generator; the voltage knob is electrically connected to the power generator, the voltage knob adjusts input voltage of the power generator; the power generator is electrically connected to the sensor, the power generator generates alternating current according to the input voltage, and outputs the alternating current to the sensor.

11. The security device according to claim 10, wherein the security device further comprises a power supply module, the power supply module comprises a battery and a power switch, the battery supplies electric power to the security device, and the power switch controls whether the battery supplies electric power to the security device.

12. The security device according to claim 11, wherein the security device further comprises a card reading module and a data transmission module, the card reading module is electrically connected to the data transmission module, the card reading module is configured to read information of a work card; when the work card is near the card reading module, the card reading module reads the information of the work card, generates an identity signal associated with the information of the work card, and outputs the identity signal to the data transmission module.

13. The security device according to claim 12, wherein the security device further comprises an elastic member, a top of the housing comprises a detection area, and the pressure sensing module is connected to the detection area through the elastic member; when the person is positioned on the detection area, the detection area is recessed downward, and a downward recessed pressure is transmitted to the pressure sensing module through the elastic member.

14. The security device according to claim 13, wherein the automatic alarm module comprises a controller, an alarm and an alarm lamp, and the controller is electrically connected to the sensor, the sensor and the alarm lamp; the controller is configured to control light of the alarm lamp according to the trigger signal and the control signal, the alarm is configured to give an alarm according to the trigger signal and the control signal.

15. The security device according to claim 14, wherein the data transmission module comprises a data processor, a storage device and a launcher, the data processor is electrically connected to the pressure sensing module, the sensor and the launcher, and the data processor is configured to determine whether to continue to receive the identity signal according to the trigger signal; the data processor multiplexes the identity signal, the control signal, and the trigger signal, and generates a first data signal or a second data signal; the first data signal indicates the sole of the person does not comprises metal substance, and the second data signal indicates the sole of the person comprises metal substance.

16. The security device according to claim 15, wherein the storage device is electrically connected to the card reading module and the data processor, the storage device is configured to store the identity signal output by the card reading module and transmit the identity signal to the data processor; the transmitter is electrically connected to the data processor, and the launcher is configured to transmit the first data signal or the second data signal to a server by radio.

17. The security device according to claim 13, wherein a first end of the elastic member is held against the detection area, and a second end of the elastic member is connected to the pressure sensing module through the induction module.

18. The security device according to claim 10, wherein the security device further comprises a transparent panel, the detection area is disposed on an upper surface of the housing, and the transparent panel is disposed in front of the housing.

* * * * *